L. R. EVANS.
DRIVING PULLEY FOR BICYCLE WHEELS.
APPLICATION FILED DEC. 18, 1915.

1,185,077.

Patented May 30, 1916.

INVENTOR
Leigh R. Evans
BY
Lyman E. Dodge
ATTORNEY

UNITED STATES PATENT OFFICE.

LEIGH R. EVANS, OF ROCHESTER, NEW YORK, ASSIGNOR TO CYCLEMOTOR CORPORATION, OF ROCHESTER, NEW YORK, A CORPORATION OF NEW YORK.

DRIVING-PULLEY FOR BICYCLE-WHEELS.

1,185,077.  Specification of Letters Patent.  Patented May 30, 1916.

Application filed December 18, 1915. Serial No. 67,692.

*To all whom it may concern:*

Be it known that I, LEIGH R. EVANS, a citizen of the United States, and a resident of the city of Rochester, in the county of Monroe and State of New York, have invented a new and useful Driving-Pulley for Bicycle-Wheels, of which the following is a specification.

This invention relates to driving pulleys and means for attaching the same to the spokes of a bicycle wheel of ordinary or similar construction to enable power to be transmitted to the bicycle wheel by a belt or the like.

One of the objects sought to be obtained by this invention is a light and cheap driving pulley, suitable for attachment to the spokes of a bicycle wheel of ordinary construction, which can be used to transmit sufficient power to the bicycle wheel to propel the bicycle, without injuring the wheel or its spokes.

A further object is a novel, simple, cheap and durable means for attaching a driving pulley of the character specified to the spokes of a bicycle wheel which will permit the driving pulley to be easily and quickly attached by unskilled labor, and which is so constructed that the spokes will not be injured even if they are not symmetrically positioned.

Further objects of the invention will appear as the description progresses.

The invention consists in the parts, and in the combinations and arrangements of parts, more fully pointed out hereinafter.

Figure 1:
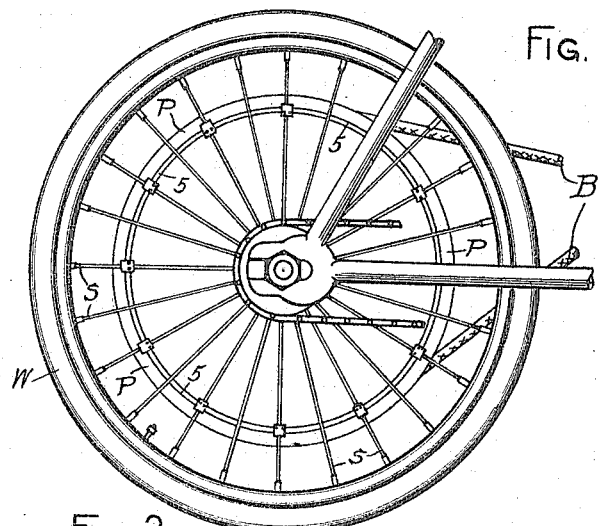
Figure 2:
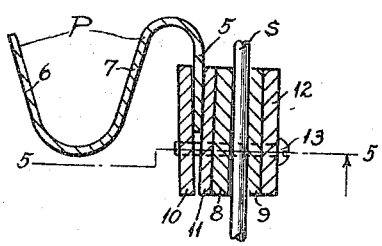
Figure 3:
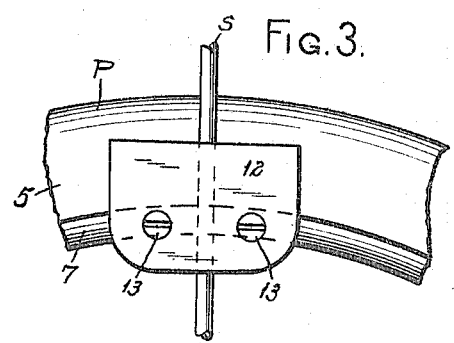
Figure 4:
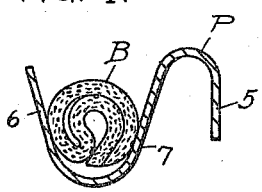
Figure 5:
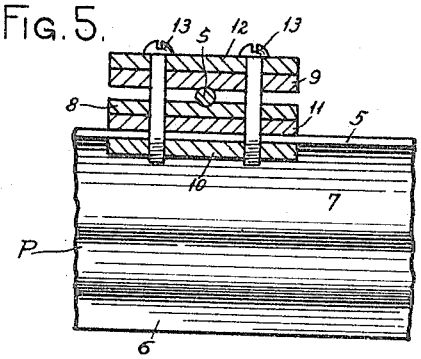

Referring to the accompanying drawing, in which is illustrated one physical embodiment of the invention, and in which like reference characters refer to like parts throughout the several views, Figure 1 is a side elevation of a bicycle wheel of ordinary and well known construction, together with a driving pulley and the means which embody this invention for attaching said pulley to the spokes of the bicycle wheel; Fig. 2 is an enlarged transverse section through the driving pulley near one of the spokes and showing in section the parts constituting the means for attaching the pulley to the spokes of the bicycle wheel; Fig. 3 is an enlarged fragmentary view in elevation of the driving pulley near one of the spokes of the bicycle wheel; Fig. 4 is an enlarged transverse section through the driving pulley showing one form of a belt in coöperative relation therewith; and Fig. 5 is a horizontal section through the means for attaching the driving pulley to the spokes of the bicycle wheel, said section being taken substantially on the line 5—5 in Fig. 2, looking in the direction of the arrow.

The driving pulley embodying this invention forms part of an equipment adapted to be attached to the ordinary bicycle so as to convert it into a power driven vehicle or motorcycle; and in developing a driving pulley of this nature, new problems, heretofore unencountered in transmitting power to bicycle wheels, had to be solved. In the ordinary bicycle, in which the power is supplied by the feet of the rider, the sprocket connected to the pedals should, as far as is consistent with obtaining adequate power to climb hills, revolve slower than the bicycle wheel; and consequently the sprocket connected to the bicycle wheel may be small and readily connected to the axle of the bicycle wheel. When a motor is used to propel the bicycle, however, different conditions prevail, and the pulley driven by the engine should be small and the pulley connected to the bicycle wheel large, especially when a small high speed motor developing a relatively small torque is used. When the rear pulley or sprocket attached to the rear bicycle wheel becomes large, it is a matter of extreme difficulty to make it of sufficient rigidity, without being prohibitive in weight, as to permit it being attached directly to the axle of a bicycle wheel of any of the standard makes; and even if such a pulley of universal application could be designed, it would be a matter of great difficulty to dismount the rear bicycle wheel, readjust the parts and attach the pulley without skilled labor and probably special machine work, so that such a pulley would have no utility as an article to be sold to the general public as part of an equipment suitable for transforming an ordinary bicycle into a motorcycle. Like difficulties are met when it is attempted to fasten the pulley to the rim of the bicycle wheel, since the rim does not readily offer itself to any simple clamping attachments, and requires special adjustable anchoring devices, which, while they may be made applicable to certain makes of bicycles, are not of universal use. Moreover, if the pulley is attached to the rim of the bicycle wheel, the belt or chain is too close to the ground.

From these considerations it is apparent that the logical place to provide for the attachment of a pulley of a character suitable for easy attachment to any standard make of bicycle is the spokes of the wheel, but when this is attempted, other difficulties of a different nature are encountered. In the first place all of the spokes of a bicycle wheel do not lie in the same plane, the outer ends at the rim being usually in the same plane, but the inner ends at the hub being alternately secured to opposite ends of the hub. This means that it is practically impossible to attach the pulley to each of the spokes; and it is essential that the few spokes to which it is practical to attach the pulley, should share equally in the burden of transmitting the power to the wheel. The difficulty of fastening a rigid member to a plurality of other members so that the latter members shall divide the stresses equally is well appreciated by those skilled in the art, and this difficulty prohibits anything in the nature of an absolutely rigid connection between the pulley and each of the spokes. Also, while it is intended that the spokes of bicycle wheels should be constructed so that the spokes on one side of the hub shall lie in the surface of the same cone, that is, at a given distance from the axis of the wheel, the spokes on the same side of the hub should be in the same plane, it is a notorious fact that in reality such exact location does not always exist. This leads to the curious anomaly that whereas the pulley should be straight and true so that the belt may be properly guided to it, the points at which the pulley should be fastened are not in the same plane but are disposed irregularly. In other words, a pulley suitable for attachment to the spokes of a bicycle wheel must have certain characteristics, which are antagonistic to a certain extent. The pulley must be stiff and rigid enough so as to not collapse radially, must have a portion thereof for receiving the belt which is stiff and rigid transversely so as to maintain its different points in the same plane under the driving stress, and finally must be provided with suitable means for attaching it to different points irregularly disposed. The requisite stiffness and rigidity against radial collapse and sidewise displacement may be obtained by any suitable pulley. The necessary requisite of the attaching means may be obtained by including in the connection between the rigid pulley portion proper and the spokes a member or members capable of sidewise displacement relative to that pulley portion. The attaching means should also be of such a nature that the spokes will not be injured, and particularly is it necessary to avoid metal to metal contact which has a tendency to "gnaw", cut and distort the spokes.

In the particular embodiment of the invention illustrated, the driving pulley P is made of a flat strip of resilient sheet metal, which is bent or shaped in any suitable way into a ring having the cross section shown to the best advantage in Figs. 2 and 4, said cross section affording a relatively flexible attaching flange 5, and a belt groove having two relatively inclined walls 6 and 7. In bending this flat strip of sheet metal, it is preferably first bent slightly along longitudinal lines on a hand brake or other machine, and then passed through suitable bending rollers which form the desired cross section and also curve the strip into a circular form, whereupon the ends are overlapped and welded, or otherwise suitably fastened together. Fig. 4 illustrates a belt B in coöperative relation with the belt groove, and from this Fig. 4 it can be seen that the belt B is gripped by the side walls 6 and 7 as it is drawn radially into the belt groove.

The portion of the pulley P constituting the belt groove is formed of the same piece of resilient sheet metal as the attaching flange 5, this being done to simplify the structure and reduce the cost of production, and it is found that this portion of the pulley possesses the necessary rigidity and stiffness against radial collapse and sidewise displacement; but, if desired, this portion constituting the belt groove may be made separately of a thicker and stiffer metal than the attaching flange 5. The attaching flange 5 is disposed in a plane substantially parallel with the plane of the belt groove and affords a material stiffening reinforcement for the pulley against distortion radially and circumferentially; but this flange itself is capable of considerable displacement sidewise of the pulley so as to permit this flange to be drawn into contact with the different spokes regardless of their location and without distorting the belt groove.

The attaching flange 5 of the driving pulley P is attached to as many spokes S of the bicycle wheel W as desired, being shown attached to all of the spokes on the same side of the wheel W. The means for attaching this flange 5 to each of the spokes S comprises a number of similarly shaped parts, the parts 8 and 9 on opposite sides of the spoke S being of fiber or similar material. On one side of the spoke S are arranged two metallic clamping members 10 and 11, between which is disposed the attaching flange 5; and on the opposite side of the spoke S is a metallic plate 12 which presses against the opposite fiber piece 9. The outer clamping member 10 adjacent to the attaching flange 5 has two threaded holes therein located on opposite sides of the spoke S, as shown in Fig. 5;

and in the other clamping member 11, in each of the fiber pieces 8 and 9, and in the plate 12 are two smooth holes alined with the threaded holes in the clamping member 10. Through the holes in these different parts pass two screws 13 of ordinary construction which serve to clamp all of these parts together and to the spoke S.

Referring to Fig. 2, it can be seen that the outer clamping member 10 bears for only part of its width against the attaching flange 5, while the other or lower part of said clamping member 10 can be drawn by the screws 13 toward the inner clamping member 11. The effect of this arrangement is that, when the screws 13 are tightened, the outer clamping member 10 is slightly sprung and the threads in it, with which the screws 13 coöperate, are distorted sufficiently to securely lock the screws 13 and prevent them from loosening. In short, the outer clamping member 10 acts both as a nut and a lock washer, as well as a clamping member. This locking action of the outer clamping member 10 forms an important feature of this invention, since any extra parts, such as nuts and lock washers, are thereby dispensed with, and since it materially facilitates the attachment of the pulley P to the spokes of the wheel W, it being unnecessary to fit a nut and a lock washer to each of the screws 13 and to hold these nuts against movement while tightening the screws, which is an extremely difficult operation because one is obliged to work on both sides of the wheel at one and the same time.

It should be noted that the spokes S are gripped between pieces of a relatively soft and yielding material, which will not "gnaw," cut or damage the spokes. The resiliency of the material from which the pulley is made, together with the yielding qualities of the fiber pieces 8 and 9, prevents severe shocks and sudden stresses being directly transmitted to the spokes with full force, and in this way obviates the breaking of the spokes which is so likely to occur with the pulley rigidly attached to the spokes of a bicycle wheel.

Although I have shown and described what I consider to be the preferred physical embodiment of my invention, it is obvious that various changes may be made in the particular construction shown and described without departing from my invention; and I do not wish to be restricted to this particular construction shown and described, other than in accordance with a reasonable interpretation of the appended claims.

What I claim is:

1. A driving pulley adapted to be attached to the spokes of a bicycle wheel or the like comprising a portion shaped to receive a belt, and a relatively flexible flange secured to said portion and capable of a limited amount of movement sidewise of said pulley.

2. A driving pulley adapted to be attached to the spokes of a bicycle wheel or the like comprising a strip of resilient sheet metal formed into a ring having a belt groove and an attaching flange, said flange being disposed substantially in the plane of said pulley and being capable of a limited amount of movement sidewise of said pulley.

3. A driving pulley adapted to be attached to the spokes of a bicycle wheel or the like comprising a strip of resilient sheet metal formed into a ring having a belt groove, one marginal portion of said strip being spaced from the adjacent wall of said belt groove and being disposed substantially in a plane parallel with the plane of said belt groove.

4. Means for transmitting power by a belt to bicycle wheels and the like comprising a relatively stiff pulley having a belt groove, a relatively flexible member secured to said pulley and disposed in a plane substantially parallel with the plane of said belt groove, said member being capable of a limited amount of displacement sidewise of said pulley, and means for attaching said member to the spokes of said wheel.

5. Means for transmitting power by a belt to bicycle wheels and the like comprising a pulley having a belt groove and a relatively flexible flange, and means for yieldingly clamping said flange to the spokes of said wheel.

6. A driving pulley adapted to be attached to the spokes of a bicycle wheel comprising a portion shaped to receive a belt, and a member of relatively flexible material connected to said portion, said member being disposed substantially in a plane parallel to the plane of said belt groove, and being capable of sidewise movement relatively to said portion.

7. A driving pulley adapted to be attached to the spokes of a bicycle wheel or the like comprising a strip of resilient sheet metal formed into a ring and having relatively inclined walls connected by a rounded portion to constitute a belt groove, said strip having one marginal portion thereof disposed in a plane substantially parallel with the plane of said belt groove and connected to one of said side walls.

8. Means for transmitting power by a belt to the wheel of a bicycle or the like comprising a pulley having a belt groove and a relatively flexible attaching flange, and means for attaching said flange to the spokes of said wheel, said means comprising pieces of a relatively yieldable material for engaging opposite sides of each spoke, metallic clamping members for engaging opposite faces of said attaching flange, and means for clamping said pieces and said members together.

9. Means for transmitting power by a belt to the wheel of a bicycle or the like comprising a driving pulley having an attaching flange, metallic clamping members for engaging opposite faces of said attaching flange, said members having alined holes therein, the holes in one of said members being threaded, screws passing through said holes for drawing said members toward each other, a portion of the member having the threaded holes therein being free to move toward the other member, whereby said first member acts to grip the threads of said screws when they are tightened.

10. Clamping means for attaching driving pulleys and the like to a spoke of a bicycle wheel comprising pieces of a relatively yieldable material disposed on opposite sides of said spoke, metallic clamping members disposed outside of said pieces and having threaded holes therein, and means including threaded members coöperating with the threaded holes of said clamping members and acting when tightened to draw said clamping members together, said clamping members being relatively displaced when said means is tightened to grip the threads of said threaded members.

LEIGH R. EVANS.

Copies of this patent may be obtained for five cents each, by addressing the "Commissioner of Patents Washington, D. C."